US012081948B2

(12) United States Patent
Yeh et al.

(10) Patent No.: US 12,081,948 B2
(45) Date of Patent: Sep. 3, 2024

(54) SELF-FITTING HEARING COMPENSATION DEVICE WITH REAL-EAR MEASUREMENT, SELF-FITTING HEARING COMPENSATION METHOD THEREOF AND COMPUTER PROGRAM PRODUCT

(71) Applicant: Rehear Audiology Company Ltd., Taipei (TW)

(72) Inventors: Ming-Han Yeh, Taipei (TW); Ying-Hui Lai, Taipei (TW)

(73) Assignee: GMI Technology Inc., Taipei (TW)

(*) Notice: Subject to any disclaimer, the term of this patent is extended or adjusted under 35 U.S.C. 154(b) by 187 days.

(21) Appl. No.: 17/952,678

(22) Filed: Sep. 26, 2022

(65) Prior Publication Data

US 2023/0403522 A1 Dec. 14, 2023

(30) Foreign Application Priority Data

Jun. 14, 2022 (TW) ................................. 111122067
Jul. 13, 2022 (CN) ......................... 202210827166.5

(51) Int. Cl.
*H04R 25/00* (2006.01)

(52) U.S. Cl.
CPC ........... *H04R 25/70* (2013.01); *H04R 25/305* (2013.01); *H04R 25/554* (2013.01); *H04R 2460/01* (2013.01)

(58) Field of Classification Search
CPC .... H04R 25/70; H04R 25/305; H04R 25/554; H04R 2460/01
USPC .......................................................... 381/321
See application file for complete search history.

(56) References Cited

U.S. PATENT DOCUMENTS 7,242,778 B2 * 7/2007 Csermak .............. H04R 25/305 381/60
2008/0298600 A1 12/2008 Poe et al.
2013/0243206 A1 9/2013 Goldstein et al.
2016/0196819 A1 * 7/2016 Wurtz .............. G10K 11/17854 381/94.3

(Continued)

FOREIGN PATENT DOCUMENTS

CN 116709116 A * 9/2023 ........... G10K 11/178
EP 2 234 414 A2 9/2010
WO WO-2021189990 A1 * 9/2021 ........... H04R 25/505

OTHER PUBLICATIONS

Extended European Search Report issued Nov. 7, 2023 in Application No. 23179033.8.

*Primary Examiner* — Sean H Nguyen
(74) *Attorney, Agent, or Firm* — Sughrue Mion, PLLC

(57) ABSTRACT

A self-fitting hearing compensation device with real-ear measurement is provided and includes: a first transducer, which receives a first test signal from a device and converts the first test signal into a first electrical signal; a first hearing compensation module, which is connected to the first transducer and performs gain compensation on the first electrical signal; a second transducer, which is connected to the first hearing compensation module, converts the gain-compensated first electrical signal into sound, and transmits the sound into an ear canal; and a third transducer, which synchronously converts the sound transmitted in the ear canal into a second electrical signal, so as to transmit the second electrical signal to the device via a wireless transmission network. In addition, a self-fitting hearing compensation method and a computer program product are also provided.

20 Claims, 12 Drawing Sheets

(56) References Cited

U.S. PATENT DOCUMENTS

| | | | | |
|---|---|---|---|---|
| 2016/0309270 | A1* | 10/2016 | Miller | H04R 3/005 |
| 2022/0030349 | A1* | 1/2022 | Li | G10K 11/17815 |

* cited by examiner

SELF-FITTING HEARING COMPENSATION DEVICE WITH REAL-EAR MEASUREMENT, SELF-FITTING HEARING COMPENSATION METHOD THEREOF AND COMPUTER PROGRAM PRODUCT

BACKGROUND

1. Technical Field

The present disclosure relates to a hearing compensation technology, and more particularly, to a self-fitting hearing compensation device with real-ear measurement (REM) analysis and self-fitting hearing compensation method thereof.

2. Description of Related Art

According to statistics, there are more than 120,000 people with hearing impairments in Taiwan who have certified physical and mental disabilities. Hearing problems will lead to invisible or significant barriers to language communication, occupational adaptation, social participation, school learning, life safety and other important aspects of life.

Besides, Taiwan is about to enter a super-aged society, and hearing loss ranks among the top three chronic diseases among the elderly. Recently, due to the advancement of modern hearing aids and hearing aid technology on the market, the negative impact and burden of hearing impairment on individuals, families, communities, and even the whole society can be greatly improved.

However, modern hearing aids and hearing aid technology still require real-ear analyzers for adjustment. The conventional real-ear analyzer is provided with a probe, which has a first microphone and a second microphone. The first microphone is used for capturing sound near the opening of the ear canal, and the second microphone is used for capturing sound near the eardrum. When conducting the real-ear test analysis, the probe is firstly inserted into the ear canal with the tip of the probe about 5 mm away from the eardrum, and then the sound changes in the ear canal are tested without wearing a hearing aid and after wearing a hearing aid respectively so as to obtain a real-ear insertion response (REIR). For instance, the operation steps of the conventional real-ear test are: (1) when there is no hearing aid placed in the opening of the ear canal, i.e., the opening of the ear canal is open, the sound field emits sound (including all frequencies with the same sound pressure level), and the sound pressure level difference curve recorded by the first microphone and the second microphone is called real-ear unaided response (REUR) (also called real-ear unaided gain [REUG]), and (2) when a hearing aid is placed in the opening of the ear canal, the sound filed emits sound, and the sound pressure level difference curve recorded by the first microphone and the second microphone is called real-ear aided response (REAR) (also called real-ear aided gain [REAG]). However, since the real-ear test must be performed in an audiometric testing room using instruments and hearing professionals are needed to execute the real-ear test, the real-ear test is less efficient and less immediate.

In addition, the measured real-ear response is often inconsistent with the result expected by a fitting software, which is mainly because the acoustic properties (e.g., resonance, volume, impedance, etc.) of the hearing-impaired person's outer ear and inner ear may be different from the "average ear" information used in the software prediction. When conducting a real-ear test, the unique ear canal characteristics of the hearing-impaired person will be reflected, resulting in some errors. Furthermore, acoustic parameters of the hearing aids of the hearing-impaired persons, such as stomatal size or eardrum depth, are different. Therefore, the real-ear test requires additional gain adjustment to match the specified or expected target gain.

Additionally, insertion gain measurements are a common method for verifying performance characteristics of hearing aids. However, as mentioned above, insertion gain has many limitations in hearing aid tuning, resulting in errors.

Based on the above reasons, how to provide a hearing compensation device and a hearing compensation method that do not need a real-ear analyzer and a probe transducer (i.e., a probe microphone), do not need to be limited to a professional hearing space (such as an audiometric testing room) for conducting a real-ear measurement analysis and do not need the assistance of a hearing professional (such as a professional tuner) for effectively solving the above problems, where the hearing compensation device and the hearing compensation method can provide accurate, real-time, automated and customized hearing devices (e.g., auditory aids, hearing aids, earphones and glasses with hearing aid functions, ANC earphones, or TWS earphones) for users (especially hearing-impaired patients) in the current real environment of a non-audiometric testing room, have become an urgent issue for the industry to solve.

SUMMARY

In order to address the aforementioned problems of the prior art, the present disclosure provides a self-fitting hearing compensation device with real-ear measurement, which comprises: a first transducer configured to receive a first test signal from a device and convert the first test signal into a first electrical signal; a first hearing compensation module connected to the first transducer and configured to perform gain compensation on the first electrical signal; a second transducer connected to the first hearing compensation module, wherein the second transducer converts the gain-compensated first electrical signal into sound and transmits the sound into an ear canal; and a third transducer configured to synchronously convert the sound transmitted in the ear canal into a second electrical signal, wherein the third transducer transmits the second electrical signal to the device via a wireless transmission network, wherein the device calculates an energy distribution of the second electrical signal in each frequency band, and compares an error between the energy distribution and a target gain and a hearing threshold via a second hearing compensation module, wherein if the error does not meet an error target, the device quantizes the error to generate corrected filter parameters via a compensation gain conversion model, and the corrected filter parameters are transmitted to the first hearing compensation module via the wireless transmission network to perform hearing gain compensation.

The present disclosure also provides a self-fitting hearing compensation method with real-ear measurement, which comprises: receiving and converting, by a first transducer, a first test signal from a device into a first electrical signal; performing, by a first hearing compensation module connected to the first transducer, gain compensation on the first electrical signal; converting, by a second transducer connected to the first hearing compensation module, the gain-compensated first electrical signal into sound, wherein the second transducer transmits the sound into an ear canal;

synchronously converting, by a third transducer, the sound transmitted in the ear canal into a second electrical signal, wherein the third transducer transmits the second electrical signal to the device via a wireless transmission network; calculating, by the device, an energy distribution of the second electrical signal in each frequency band; and comparing, by a second hearing compensation module, an error between the energy distribution and a target gain and a hearing threshold, wherein if the error does not meet an error target, the device quantizes the error to generate corrected filter parameters via a compensation gain conversion model, and the corrected filter parameters are transmitted to the first hearing compensation module via the wireless transmission network to perform hearing gain compensation.

Besides, in an embodiment as shown in FIG. 6, the present disclosure also provides a self-fitting hearing compensation method with real-ear measurement, which comprises: receiving and converting, by a first transducer, a first test signal from a device into a first electrical signal; performing, by a first hearing compensation module connected to the first transducer, gain compensation on the first electrical signal; converting, by a second transducer connected to the first hearing compensation module, the gain-compensated first electrical signal into sound, wherein the second transducer transmits the sound into an ear canal; synchronously converting, by a third transducer, the sound transmitted in the ear canal into a second electrical signal, wherein the third transducer transmits the second electrical signal to the device via a wireless transmission network; calculating, by the device, an energy distribution of the second electrical signal in each frequency band; comparing an error between the energy distribution and a target gain and a hearing threshold; calculating a required gain compensation by using a compensation prescription according to the hearing threshold; transmitting the required gain compensation to the compensation gain conversion model; calculating required auditory dynamic range application optimization parameters by using auditory dynamic range application optimization according to the hearing threshold; and transmitting the required auditory dynamic range application optimization parameters to the compensation gain conversion model, wherein if the error does not meet an error target, the device quantizes the error to generate the corrected filter parameters via a compensation gain conversion model, and the corrected filter parameters are transmitted to the first hearing compensation module via the wireless transmission network to perform hearing gain compensation.

In an embodiment, the first hearing compensation module is arranged in an active noise cancellation chip or a digital signal processing circuit chip.

In an embodiment, the corrected filter parameters are filter parameters of gain compensation of an active noise cancellation or gain compensation parameters of a digital signal processing circuit.

In an embodiment, the filter parameters of the gain compensation of the active noise cancellation are audio gain compensation filter unit parameters. In other words, gain compensation unit of the active noise cancellation technology is audio gain compensation filter unit of the active noise cancellation technology, such as SZ or APT filter, and filter parameters of the audio gain compensation filter unit are for example SZ or APT filter parameters.

In an embodiment, the present disclosure further comprises: a storage module, wherein if the error does meet the error target, the device stores the corrected filter parameters to the storage module.

In an embodiment, the device stores original filter parameters or the corrected filter parameters to an apparatus with audio processing capability, wherein the apparatus has a third hearing compensation module to perform hearing gain compensation.

In an embodiment, the hearing compensation module in the device, through the hearing compensation device based on the real-time customized audiogram or hearing table obtained by the user in the current real environment, automatically searches for optimal filter parameter value generated by a plurality of sets of parameters of a plurality of filters as the original filter parameter via noise cancellation technology combined with optimization methods and cost functions, but the present disclosure is not limited to as such.

In an embodiment, the present disclosure further comprises: a wireless transceiver module, wherein the wireless transceiver module receives a second test signal from the device via the wireless transmission network to perform hearing gain compensation. In addition, the first test signal is transmitted in the air, and the second test signal is transmitted via wireless communication.

In an embodiment, if the error does not meet the error target, the device quantizes the error again and transmits the quantized error and auditory dynamic range application optimization parameters to the compensation gain conversion model to generate another corrected filter parameters via the compensation gain conversion model, and the another corrected filter parameters are transmitted to the first hearing compensation module via the wireless transmission network to perform the hearing gain compensation.

In an embodiment, the device further comprises: a probe or a long earplug, one end thereof is connected to the third transducer, and the other end thereof is positioned at shortest into an ear canal and at longest near (such as 1 mm or closer) to an eardrum, wherein the closer said the other end thereof to the eardrum, the more precise high frequency audio quality would be obtained.

In another embodiment, one end of the probe or the long earplug is connected to the third transducer, and the other end is positioned into a first curve of an external ear canal or to a distance of about a few mm (such as 5 mm) from the eardrum, etc., such that the obtained high frequency audio quality is more precise than the current technology.

In an embodiment, the self-fitting hearing compensation device with real-ear measurement and the self-fitting hearing compensation method with real-ear measurement perform an audiometry in a non-audiometric testing room environment.

In an embodiment, the self-fitting hearing compensation device with real-ear measurement is arranged in a hearing aid with an active noise cancellation or a digital signal processing circuit, and the self-fitting hearing compensation method with real-ear measurement is applied to the self-fitting hearing compensation device, where the self-fitting hearing compensation device is not a dedicated earphone in the audiometric testing room and does not require assistance of a hearing professional; in another embodiment, the self-fitting hearing compensation method with real-ear measurement is applied to a hearing aid with an active noise cancellation or a digital signal processing circuit.

In an embodiment, the self-fitting hearing compensation device with real-ear measurement and the self-fitting hearing compensation method with real-ear measurement are processed automatically, in real-time, and/or synchronously by an application program of the device in combination with the compensation gain conversion model and wireless communication technology.

Accordingly, the present disclosure does not require a real-ear analyzer and a probe transducer (i.e., a probe microphone), does not need to be limited to a professional hearing space when conducting a real-ear measurement analysis and does not need the assistance of a hearing professional for effectively addressing the aforementioned problems of the prior art. Further, the present disclosure can use hearing aids to perform real-ear measurement in the current real environment of a non-audiometric testing room via the wireless communication technology, and can provide accurate, real-time, automated and customized hearing aids to users.

BRIEF DESCRIPTION OF THE DRAWINGS

FIGS. 2, 2-1, 2-2 are schematic views showing the self-fitting hearing compensation device with real-ear measurement combining with a smart device according to an embodiment of the present disclosure.

DETAILED DESCRIPTIONS

Figure 1:
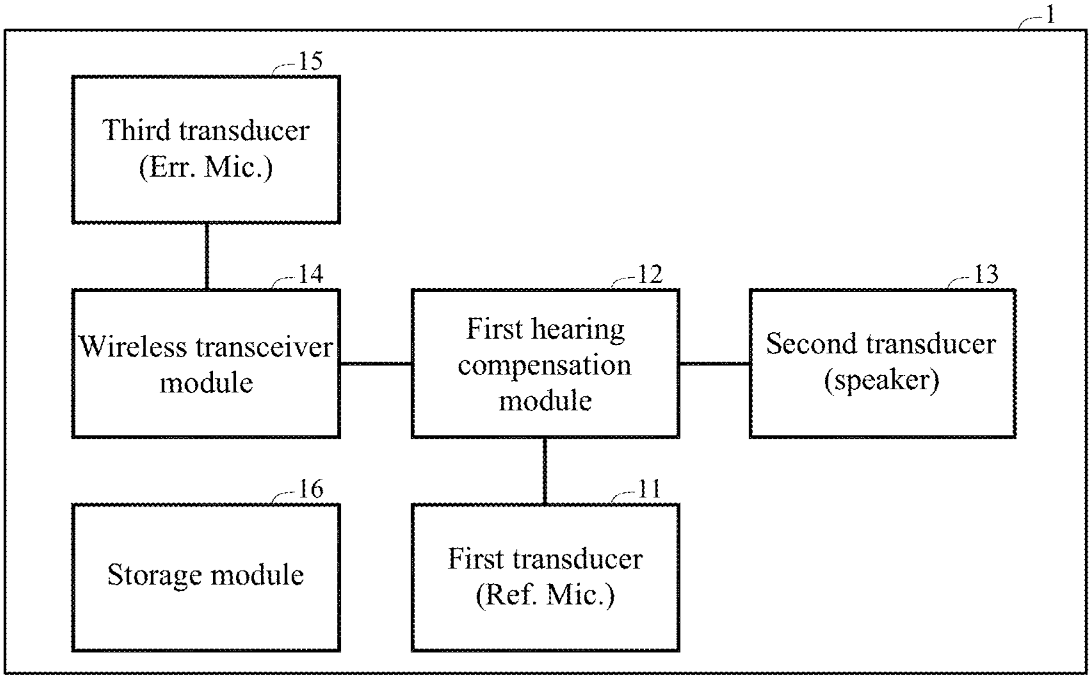
FIGS. 1, 1-1 are schematic block diagrams showing a self-fitting hearing compensation device with real-ear measurement according to the present disclosure.
Figure 1:
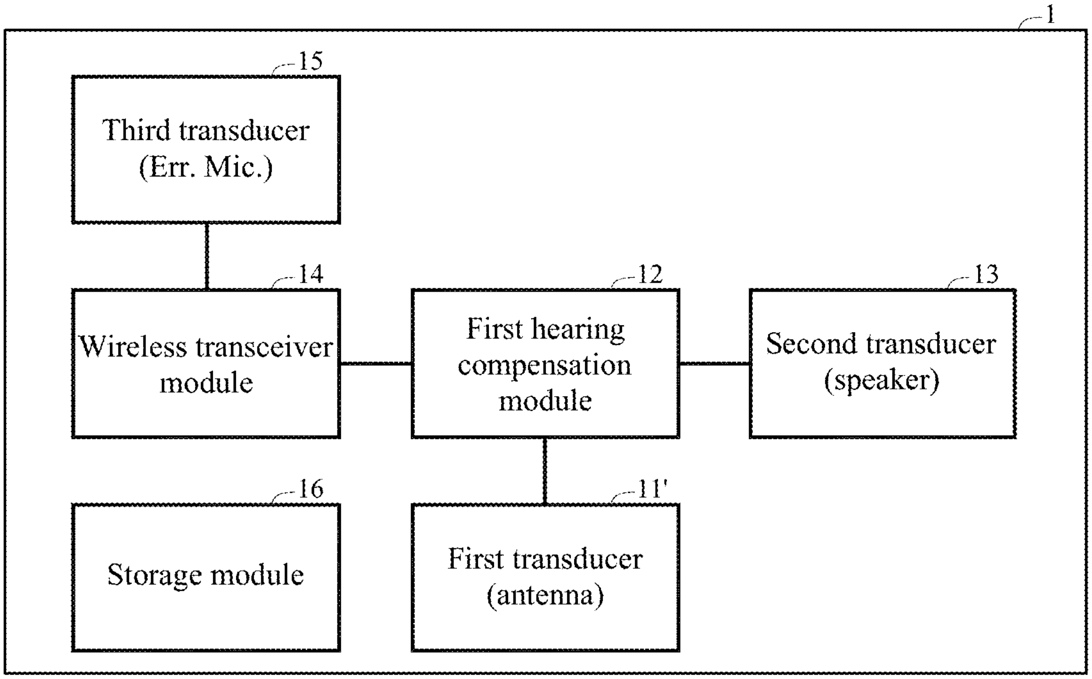

Implementations of the present disclosure are illustrated using the following embodiments. One of ordinary skill in the art can readily appreciate other advantages and technical effects of the present disclosure upon reading the content of this specification.

It should be noted that the structures, ratios, sizes, etc. shown in the drawings appended to this specification are to be construed in conjunction with the disclosure of this specification in order to facilitate understanding of those skilled in the art. They are not meant to limit the implementations of the present disclosure, and therefore have no substantial technical meaning. Any modifications of the structures, changes of the ratio relationships, or adjustments of the sizes, are to be construed as falling within the range covered by the technical content disclosed herein to the extent of not causing changes in the technical effects created and the objectives achieved by the present disclosure.

FIG. 1 is a schematic block diagram showing a self-fitting hearing compensation device with real-ear measurement according to the present disclosure. In an embodiment, as shown in FIG. 1, a self-fitting hearing compensation device 1 with real-ear measurement of the present disclosure comprises a first transducer (Ref Mic) 11, a first hearing compensation module 12, a second transducer (i.e., a speaker) 13, a wireless transceiver module (e.g., a wireless transmission and reception module) 14, a third transducer (Err. Mic) 15 and a storage module 16, wherein the first transducer (Ref. Mic) 11 receives a test signal S from a device (such as a smart device or a mobile device) and converts the test signal S into an electrical signal; the first hearing compensation module 12 is connected to the first transducer (Ref. Mic) 11 and performs gain compensation on the electrical signal; the second transducer 13 is connected to the first hearing compensation module 12, converts the gain-compensated electrical signal into sound, and transmits the sound into an ear canal; the wireless transceiver module 14 is connected to the first hearing compensation module 12; and the third transducer (Err. Mic) 15 synchronously converts the sound transmitted in the ear canal into an electrical signal $\tilde{S}$, and transmits the electrical signal $\tilde{S}$ to the device (not shown) via the wireless transceiver module 14 and a wireless transmission network (not shown), wherein the device calculates an energy distribution of the electrical signal in each frequency band by using an application program (app), its firmware, or cloud technology, and compares an error between the energy distribution and a target gain and a hearing threshold, wherein if the error does not meet an error target, then the device quantizes the error by using the app, its firmware, or cloud technology to generate a set of corrected filter parameters (e.g., a group of modified filter parameters) by a compensation gain conversion model, and the set of the corrected filter parameters is transmitted to the first hearing compensation module 12, a second hearing compensation module, or other apparatuses or devices with audio processing capability (or a hearing compensation module) via the wireless transmission network to perform hearing gain compensation. In another embodiment shown in FIG. 1-1, the first transducer is an antenna for wireless connection, and other descriptions are similar.

In an embodiment, the first hearing compensation module 12 is arranged (e.g., set) in an active noise cancellation chip or a digital signal processing circuit chip, and the second hearing compensation module is arranged in the device (such as a smart device or a mobile device) and implemented by the app, its firmware, or cloud technology, wherein the first hearing compensation module 12 is synchronized with the second hearing compensation module.

In an embodiment, the set of the corrected filter parameters is the filter parameters of the gain compensation of an active noise cancellation or the gain compensation parameters of a digital signal processing circuit, wherein the filter parameters of the gain compensation of the active noise cancellation are audio gain compensation filter unit (such as SZ or APT filter) parameters.

According to FIG. 1, the self-fitting hearing compensation device 1 with real-ear measurement of the present disclosure further comprises the storage module 16, wherein if the aforementioned error does meet the error target, then the device stores the corrected filter parameters to the storage module 16 by using the app, its firmware, or cloud technology.

Further, the device stores the original filter parameters and/or the corrected filter parameters to an apparatus or device with audio processing capability, wherein the apparatus or device has a hearing compensation module to perform hearing gain compensation. In an embodiment, an apparatus or device with audio processing capability can choose the original filter parameters or the corrected filter parameters via hearing compensation module to perform hearing gain compensation to improve listening experience by personalization.

In an embodiment, the apparatus or device with audio processing capability stores the original filter parameters and/or the corrected filter parameters to a chip with the active noise cancellation or a chip with the digital signal processing circuit to perform hearing gain compensation.

Besides, in an embodiment, if the error still does not meet the error target, then the device quantizes the error again by using the app, its firmware, or cloud technology, generates another set of corrected filter parameters (e.g., another group of modified filter parameters) via the compensation gain conversion model, and transmits the another set of the corrected filter parameters to the first hearing compensation module, the second hearing compensation module, or other apparatuses or devices with audio processing capability (or a hearing compensation module) via the wireless transmission network to perform hearing gain compensation, wherein the compensation gain conversion model can be set in cloud, server, or smart devices, and the present disclosure is not limited to as such.

Figure 2:
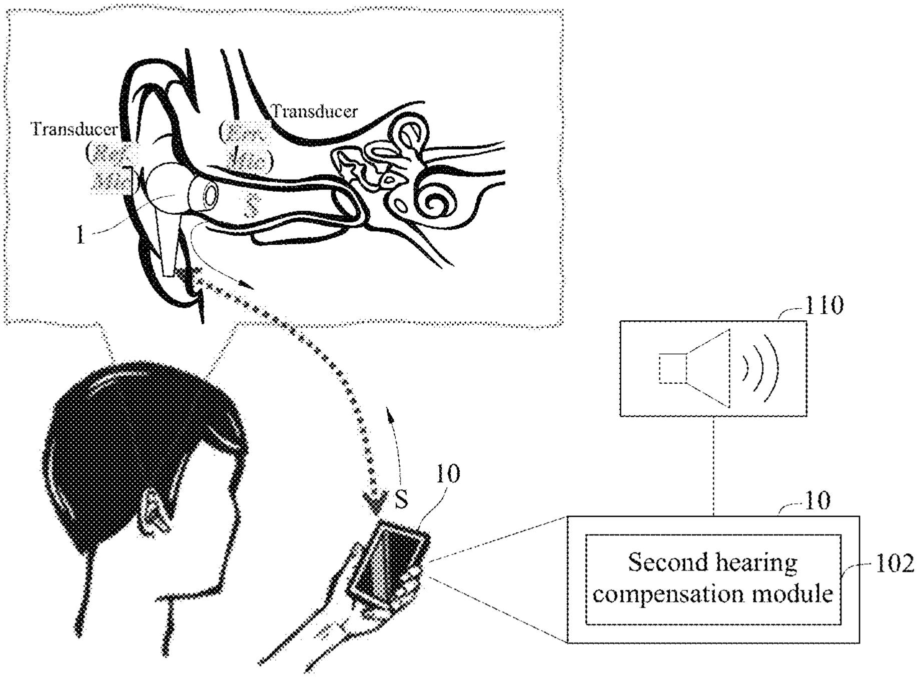
Figures 1, 2:
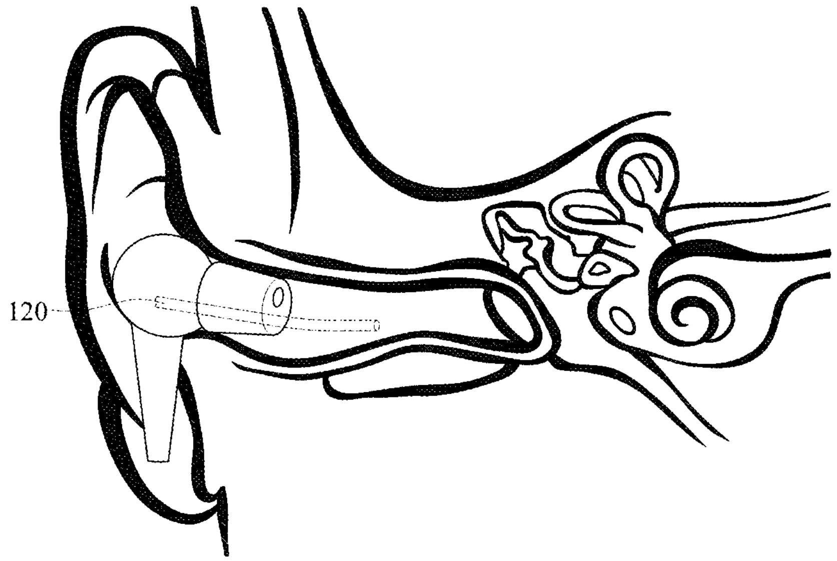
Figure 2:
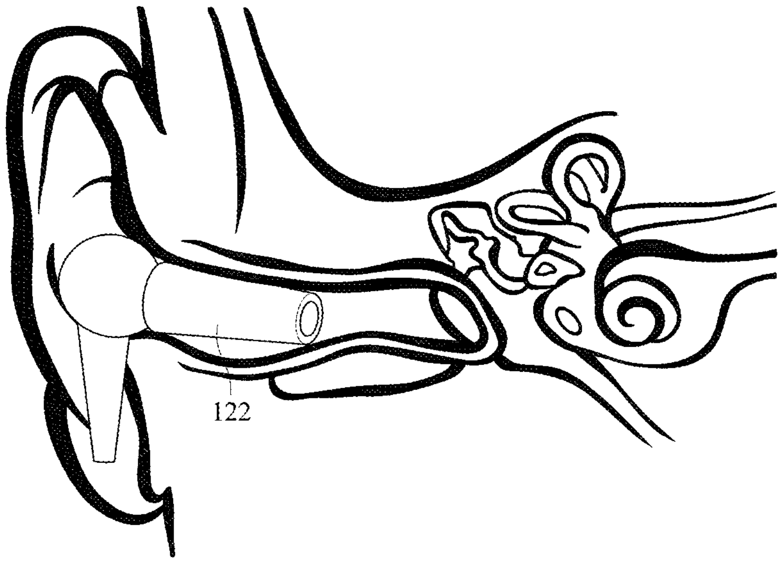

In another embodiment, as shown in FIG. 1 and FIG. 2, the wireless transceiver/transceiving module of the self-fitting hearing compensation device 1 with real-ear measurement of the present disclosure can also receive a test signal S from a device (such as a smart device or a mobile device) 10 via the wireless transmission network (not shown). Similar to the above embodiment, if the wireless transceiver/transceiving module of the self-fitting hearing compensation device 1 with real-ear measurement receives the test signal S from the device 10 via the wireless transmission network (not shown), then the first hearing compensation module 12 performs gain compensation on the test signal S; the second transducer 13 is connected to the first hearing compensation module 12 to convert the gain-compensated test signal into sound, and transmits the sound into the ear canal; the wireless transceiver module 14 is connected to the first hearing compensation module 12; the third transducer (Err. Mic) 15 synchronously converts the sound transmitted in the ear canal into an electrical signal and transmits the electrical signal to the device 10 via the wireless transceiver module 14 and the wireless transmission network, wherein the device 10 calculates an energy distribution of the electrical signal in each frequency band by using the app, its firmware, or cloud technology, and compares the error between the energy distribution and the target gain and the hearing threshold via a second hearing compensation module 102. If the error does not meet the error target, then the device 10 quantizes the error by using the app, its firmware, or cloud technology to generate a set of corrected filter parameters by the compensation gain conversion model, and the set of the corrected filter parameters are transmitted to the first hearing compensation module 12, the second compensation module 102, or other apparatuses or devices with audio processing capability (or a hearing compensation module) via the wireless transmission network to perform hearing gain compensation. In yet another embodiment, the wireless transceiver/transceiving module is an antenna for wireless connection, and other descriptions are similar.

In another embodiment, the first hearing compensation module 12 is arranged in the active noise cancellation chip or the digital signal processing circuit chip, and the second hearing compensation module 102 is arranged in the device 10 (such as a smart device or a mobile device) and implemented by the app, its firmware, or cloud technology, wherein the first hearing compensation module 12 is synchronized with the second hearing compensation module 102.

In an embodiment, the set of the corrected filter parameters is the filter parameters of the gain compensation of the active noise cancellation or the gain compensation parameters of the digital signal processing circuit, wherein the filter parameters of the gain compensation of the active noise cancellation are audio gain compensation filter unit (such as SZ or APT filter) parameters.

However, in another embodiment, if the error still does not meet the error target, then the device quantizes the error again by using the app, its firmware, or cloud technology, generates another set of corrected filter parameters via the compensation gain conversion model, and transmits the another set of the corrected filter parameters to the first hearing compensation module, the second hearing compensation module, or other apparatuses or devices with audio processing capability (or a hearing compensation module) via the wireless transmission network to perform hearing gain compensation, wherein the compensation gain conversion model can be arranged in the cloud, server, or smart device, and the present disclosure is not limited to as such.

In an embodiment, the self-fitting hearing compensation device with real-ear measurement of the present disclosure is arranged in a hearing aid with an active noise cancellation or a digital signal processing circuit.

In addition, all of the aforementioned modules can be hardware or firmware; if the aforementioned modules are hardware, they can be various circuits that implement hearing gain compensation, wireless transceiving, and storing, respectively, or they can be hardware units with similar technologies; if the aforementioned modules are firmware, they can be various firmware units that perform hearing gain compensation, wireless transceiving, and storing, respectively. In an embodiment, the hearing compensation module can be a hearing compensation circuit or a hearing compensation hardware/firmware unit, the wireless transceiver/transceiving module can be a wireless transceiver/transceiving circuit or a wireless transceiver/transceiving hardware/firmware unit, and the storage module can be a storage circuit of a storage hardware/firmware unit, wherein the self-fitting hearing compensation device of the present disclosure comprises but not limited to ANC.

The self-fitting hearing compensation device with real-ear measurement of the present disclosure is arranged in a hearing aid without using an additional probe transducer (i.e., a probe microphone), such that accurate, real-time (e.g., instant), automated and customized hearing aid can be provided via wireless communication technology in the current real environment of a non-audiometric testing room.

For instance, the present disclosure combines noise cancellation (such as ANC) technology with application program technology and compensation gain conversion model technology. In the current real environment of the user, there is no need to use additional probe transducers. A self-fitting hearing compensation device with real-ear measurement of the present disclosure already comprises a wireless transceiver/transceiving module, a hearing compensation module, a transducer (i.e., a speaker), a transducer (Err. Mic), a transducer (Ref. Mic) and a storage module, wherein the transducer (Ref. Mic) receives a test signal S from a device and converts the test signal S into an electrical signal; the hearing compensation module is connected to the transducer (Ref. Mic) and performs gain compensation on the electrical signal; the transducer is connected to the hearing compensation module, converts the gain-compensated electrical signal into sound, and transmits the sound into an ear canal; and the transducer (Err. Mic) synchronously converts the sound transmitted in the ear canal into an electrical signal $\tilde{S}$, and transmits the electrical signal $\tilde{S}$ to the device (not shown) via the wireless transceiver/transceiving module and a wireless transmission network (not shown), wherein the device calculates an energy distribution of the electrical signal in each frequency band, and compares an error between the energy distribution and a target gain and a hearing threshold by a hearing compensation module in the device, wherein if the error does not meet an error target, then the device quantizes the error to generate a set of corrected filter parameters by a compensation gain conversion model, and the set of the corrected filter parameters is transmitted to the hearing compensation module or other apparatuses or devices with audio processing capability (or a hearing compensation module) via the wireless transmission network to perform hearing gain compensation one more time.

In another embodiment of the present disclosure, shown as FIGS. 2-1, 2-2, the self-fitting hearing compensation device with real-ear measurement of the present disclosure can also utilize a probe 120 or a long earplug 122, one end of the probe or the long earplug can be connected to the transducer (Err. Mic), and the other end of the probe or the long earplug is positioned at shortest into an ear canal and at longest near (such as 1 mm or closer) to an eardrum, wherein the closer said the other end thereof to the eardrum, the more precise high frequency audio quality would be obtained, such that a precise, instant, automated and customizable earphone device is provided through wireless communication technology in the current real environment.

Besides, in another embodiment, one end of the probe or the long earplug is connected to the third transducer, and the other end is positioned into a first curve of an external ear canal or to a distance of about a few mm (such as 5 mm) from the eardrum, etc., such that the obtained high frequency audio quality is more precise than the current technology.

It should be noted that FIGS. 2-1, 2-2 are schematic illustrations but not limited thereto.

Figure 3:
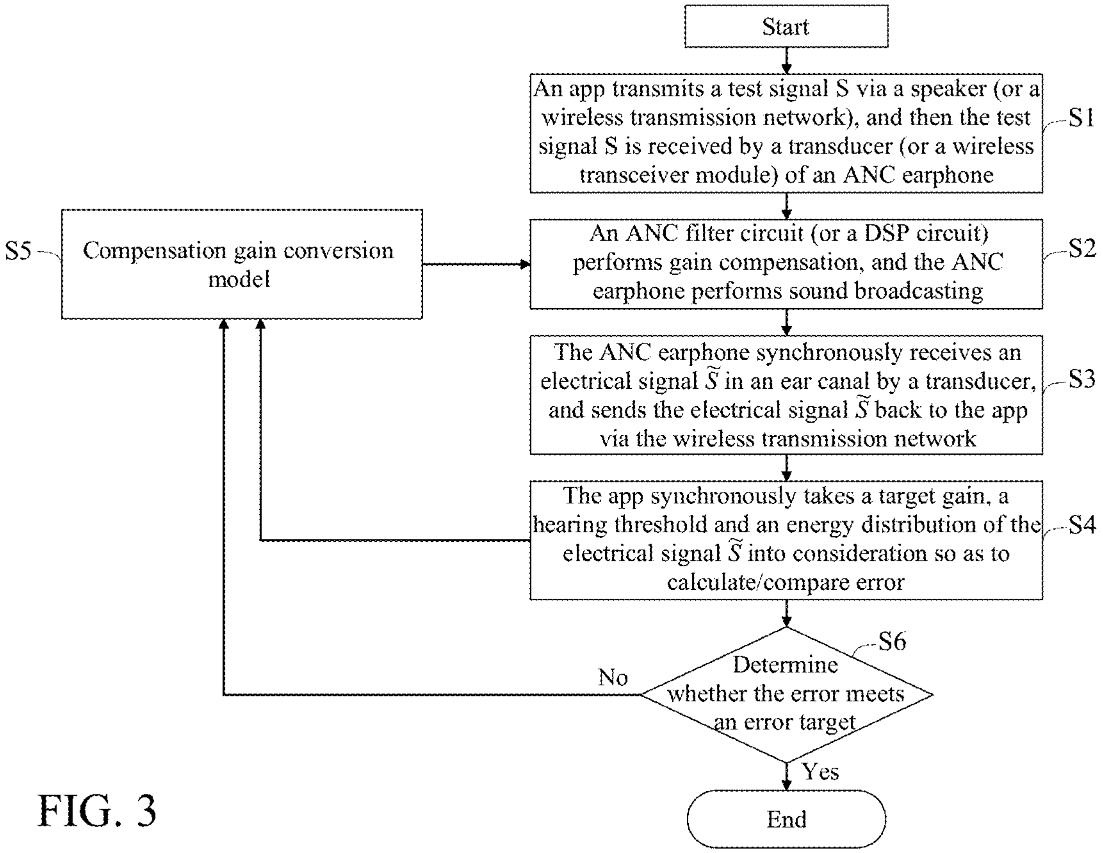
FIG. 3 is a flow chart showing steps of a hearing compensation module of the self-fitting hearing compensation device with real-ear measurement through compensation gain conversion model technique and active noise cancellation (ANC) technology according to the present disclosure.

FIG. 3 is a flow chart showing steps of a hearing compensation module of the self-fitting hearing compensation device with real-ear measurement through compensation gain conversion model technique and active noise cancellation (ANC) technology according to the present disclosure.

Firstly, in step S1, an app transmits a test signal S via a speaker of a smart device (or via a wireless transmission network), and then the test signal S is received by a transducer (Ref. Mic) (or a wireless transceiver/transceiving module) of an ANC earphone.

Next, in step S2, a filter circuit (or a digital signal processing [DSP] circuit) of the ANC earphone performs hearing gain compensation via a hearing compensation module, and a transducer (i.e., a speaker) in the ANC earphone performs sound broadcasting.

And then, in step S3, the ANC earphone synchronously converts a sound signal in an ear canal into an electrical signal $\tilde{S}$ by a transducer (Err. Mic), and sends the electrical signal $\tilde{S}$ back to the app of a smart device via a wireless transmission network.

In step S4, the app will synchronously take characteristics of an energy distribution of the calculated electrical signal $\tilde{S}$ in each frequency band, a target gain and a hearing threshold into consideration, that is, calculate/compare an error between the energy distribution, the target gain and the hearing threshold of the electrical signal $\tilde{S}$ via a hearing compensation module.

In step S5, a compensation gain conversion model automatically generates corrected filter parameters.

Lastly, in step S6, if the error does not meet an error target, then the app quantizes the error automatically to generate the corrected filter parameters by a compensation gain conversion model, and the corrected filter parameters are transmitted to the hearing compensation module via the wireless transmission network to perform hearing gain compensation again; if the error does meet the error target, then the application program automatically stores the corrected filter parameters to a storage module of the ANC earphone and/or in the smart device. Further, in another embodiment, the application program synchronously and automatically stores the original filter parameters or the corrected filter parameters to an apparatus or a device with audio processing capability (as shown by the apparatus/device 110 in FIG. 2, such as a smart device, a mobile device, a trumpet, or a speaker), wherein the apparatus or the device has a hearing compensation module for performing hearing gain compensation.

It is worth to mention that if the aforementioned error still does not meet the error target, then the app quantizes the error again to generate another set of corrected filter parameters by the compensation gain conversion model, and another set of the corrected filter parameters is transmitted to the hearing compensation module via the wireless transmission network to perform another hearing gain compensation.

Figure 4:
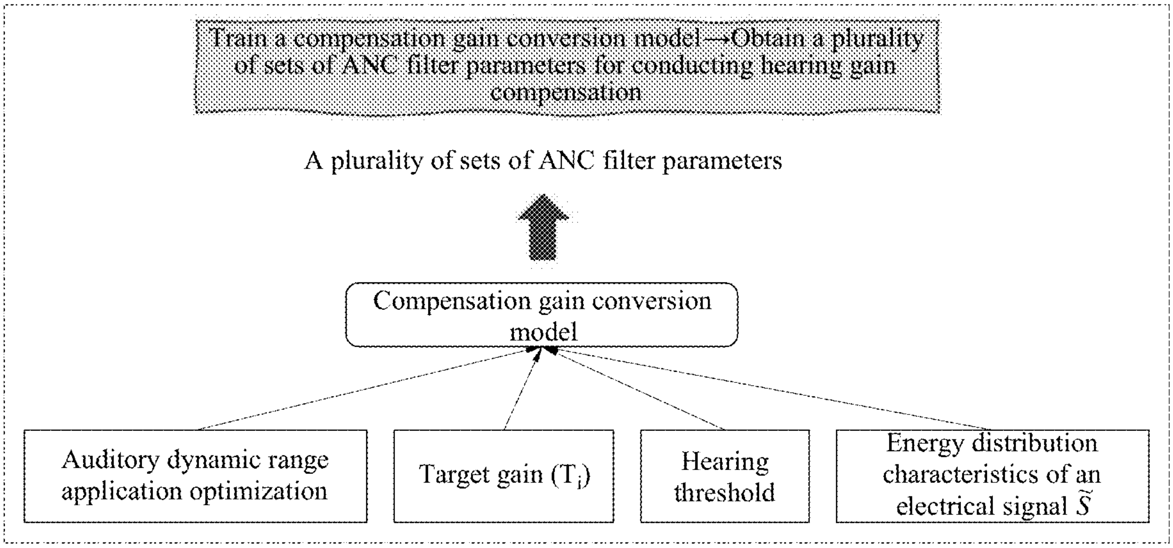
FIG. 4 is a schematic view illustrating a model training of the compensation gain conversion model according to the present disclosure.

In an embodiment, FIG. 4 shows a schematic view illustrating a model training of a compensation gain conversion model. The compensation gain conversion model can automatically generate a plurality of sets (or n sets) of ANC filter parameters via the model training according to energy distribution characteristics of an electrical signal $\tilde{S}$, a target gain, a hearing threshold and an auditory dynamic range application optimization, and the plurality of sets of the ANC filter parameters can be provided to an ANC earphone for performing hearing gain compensation.

The detailed descriptions of the calculation of the energy distribution of the electrical signal $\tilde{S}$ and the calculation of the compensation parameters via the compensation gain conversion model architecture are presented as follows.

Calculation of Energy Distribution of Electrical Signal $\tilde{S}$

Figure 5:
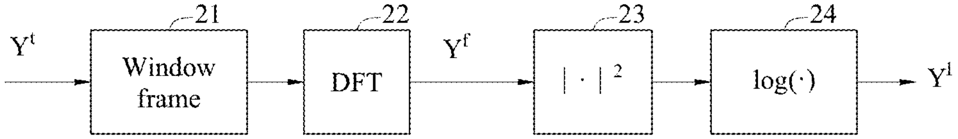
FIG. 5 is a schematic diagram illustrating a log-power spectrum (LPS) extraction method according to the present disclosure.

FIG. 5 is a schematic diagram illustrating a log-power spectrum (LPS) extraction method. In an embodiment, a transducer (Err. Mic) firstly transmits a received electrical signal $\tilde{S}$ to an app for acoustic feature extraction, and calculates the energy distribution in the electrical signal $\tilde{S}$ over a period of time via the log-power spectrum (LPS) method. When the feature is extracted, a short-time Fourier transform (STFT) on input signal is performed by calculating a discrete Fourier transform (DFT) 22 of each overlapping window frame 21, that is, the voice signal is converted from a time domain to a frequency domain via formula (1), where the formula (1) is presented as follows:

$$Y^f(k)=\Sigma_{l=0}^{L-1} Y^t(l)h(l)e^{-j2\pi kl/L} \quad (1)$$

$$k=0,1,\ldots,L-1$$

Wherein $Y^t(l)$ represents the l-th sample of an input signal (i.e., the electrical signal $\tilde{S}$) in a time domain, $Y^f(k)$ represents the spectrum of an input signal, k is the frequency index, and h(l) represents Hamming window function. Further, a log-power spectrum is defined by formula (2), which is presented as follows:

$$Y^l(k)=\log|Y^f(k)|^2 \tag{2}$$

$$k=0,1,\ldots,L-1$$

Wherein $Y^l(k)$ represents an input signal log-power spectrum. As shown in formula (2), the square of the absolute value of spectrum $Y^f(k)$ of the input signal is performed (e.g., the operation of the square of the absolute value of $Y^f(k)$ is denoted by reference number 23 or $|\bullet|^2$ as shown in FIG. 5), and then the logarithm of the square of the absolute value of spectrum $Y^f(k)$ of the input signal is performed (e.g., the operation of taking the logarithm of the square of the absolute value of $Y^f(k)$ is denoted by reference number 24 or log(•) as shown in FIG. 5), thereby obtaining the log-power spectrum $Y^l(k)$ of the electrical signal $\tilde{S}$.

At this time, the log-power spectrums under the n overlapping windows are accumulated to obtain the energy distribution characteristics of the electrical signal $\tilde{S}$.

Figure 6:
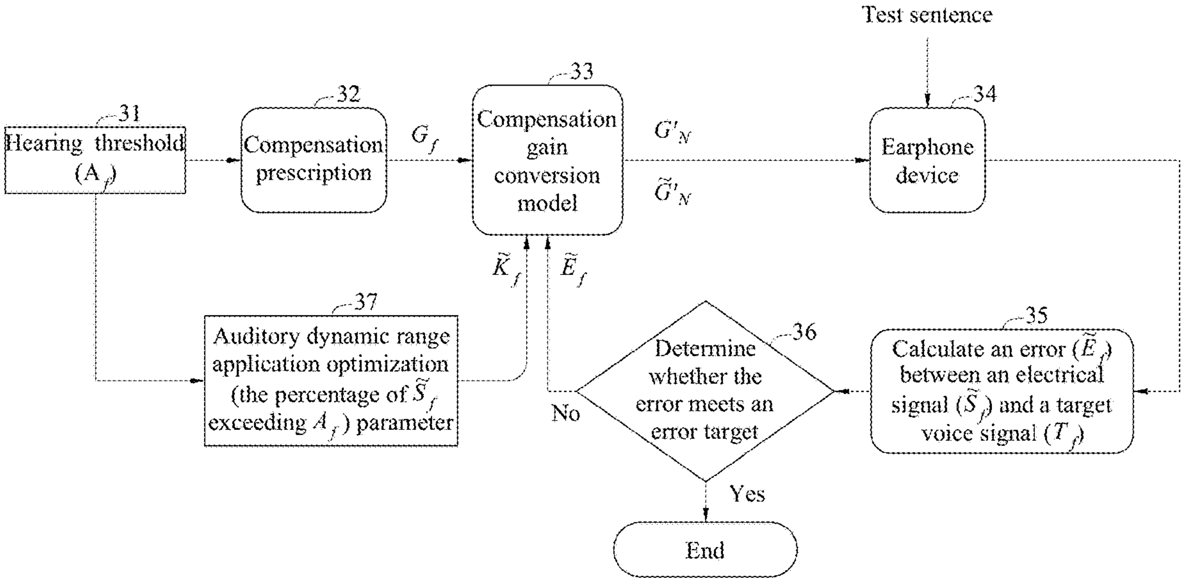
FIG. 6 is a schematic block diagram illustrating the model training of the compensation gain conversion model according to the present disclosure.

Performing Compensation Gain Parameters Via a Compensation Gain Conversion Model Architecture FIG. 6 is a schematic block diagram illustrating the model training of the compensation gain conversion model. After a hearing threshold $A_f$ 31 is obtained by the user via hearing screening, the required hearing gain compensation $G_f$ for the user is calculated via a compensation prescription 32 (such as NAL-R, NAL-RP, DSL, NAL-NL1, NAL-NL2, Aescu HRL-1, etc.). Then, the compensation gain is converted into the filter parameter gain $G'_N$ required by a circuit via a compensation gain conversion model 33 (e.g., deep learning method, machine learning method, mathematical statistics method, etc.), and the filter parameter gain $G'_N$ is transmitted to an ANC earphone device 34. The above process can be used for model training via the compensation gain conversion model architecture, and can be implemented by a target cost function as shown in formula (3):

$$L(\varphi_{NN})=\frac{1}{M}\sum_{i=1}^{M}\left(G'_{i,N}-G_{i,f}\right)^2 \tag{3}$$

Wherein N represents a plurality of sets (e.g., N sets) of filter parameters generated by the model, M represents the sample number of the training model, and i represents the i-th gain data in the training.

When the compensation gain conversion model is used for model training, the error is back-propagated to update the model parameters, and the parameter weights are adjusted so as to find the best compensation gain, as shown in formula (4):

$$\varphi'_{NN}=\underset{\varphi}{\operatorname{argmin}}(L(\varphi_{NN})) \tag{4}$$

Then, through the transducer of the ANC device, the electrical signal $\tilde{S}_f$ in the ear canal is recorded and calculated with the target voice signal $T_f$ distribution to obtain the error $\tilde{E}_f$ between the electrical signal $\tilde{S}_f$ and the target voice signal $T_f$ (e.g., the operation of calculating the error $\tilde{E}_f$ between the electrical signal $\tilde{S}_f$ and the target voice signal $T_f$ is denoted by reference number 35 as shown in FIG. 6), wherein the method of calculating error comprises the following methods: minimum mean-square error, objective evaluation index (such as HASQI, HASPI, STOI, NCM, PESQ, etc.), and the present disclosure is not limited to as such. Afterwards, whether the current error is within an acceptable range is determined via determination (e.g., the operation of determining whether the current error meets the error target is denoted by reference number 36 as shown in FIG. 6). If the error $\tilde{E}_f$ is within an acceptable range, then the matching is complete; otherwise, the error $\tilde{E}_f$ and an auditory dynamic range application optimization parameter $\tilde{K}_f$ 37 are transmitted again to the compensation gain conversion model to re-generate another set of corrected compensation gain $\tilde{G}_N$. It is worth noting that the auditory dynamic range application optimization parameter $\tilde{K}_f$ is the parameter of the percentage of $\tilde{S}_f$ exceeding $A_f$. After the above process, the above process can be repeated to make the error $\tilde{E}_f$ continue to converge to meet the set requirements, thereby completing the automatic matching process.

It is worth to mention that a DSP circuit can also perform the calculation of the energy distribution of the electrical signal $\tilde{S}$ via the aforementioned process, and use the compensation gain conversion model architecture to perform the gain compensation parameters.

Figure 7A:
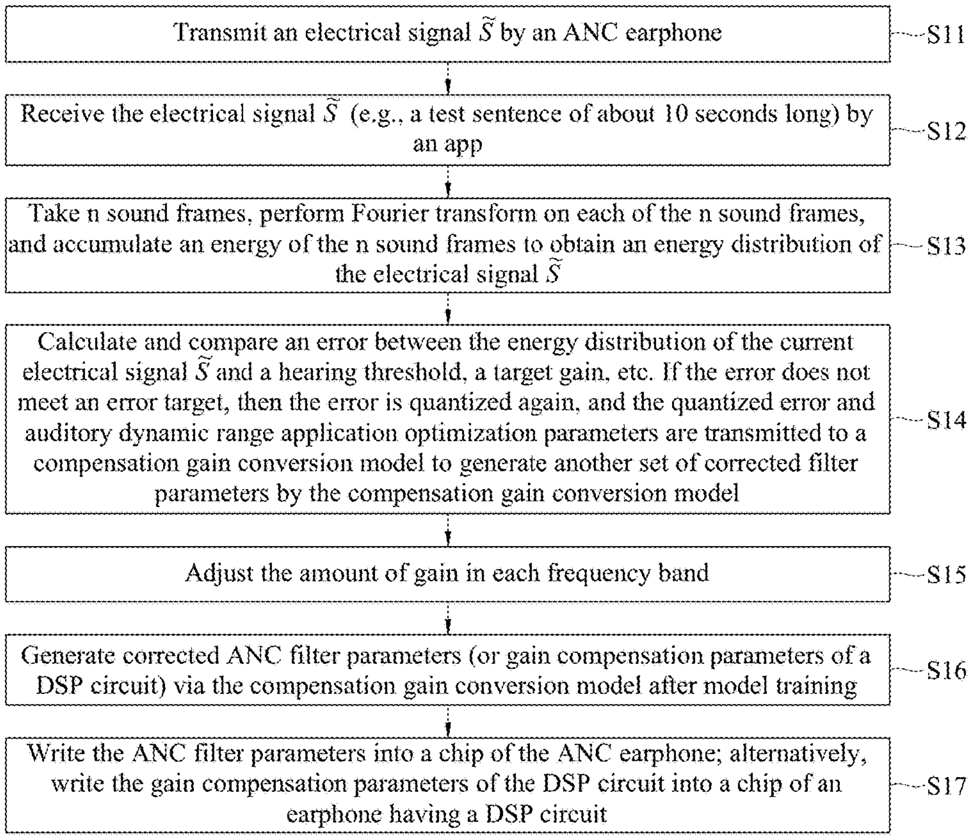
FIG. 7A is a flow chart showing steps of an application program after receiving electrical signal $\tilde{S}$ according to the present disclosure.
Figure 7B:
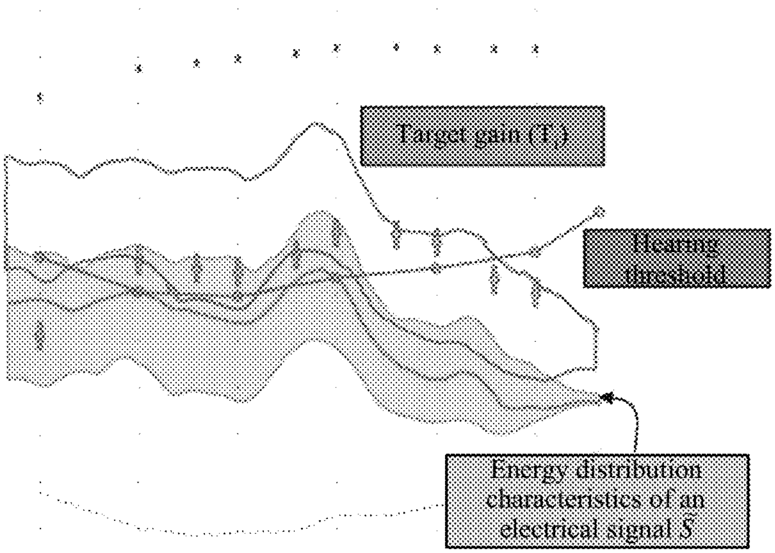
FIG. 7B is a schematic view showing target gain, hearing threshold and energy distribution of the self-fitting hearing compensation device with real-ear measurement according to the present disclosure.

FIG. 7A is a flow chart showing steps of an application program (app) after receiving an electrical signal $\tilde{S}$ according to the present disclosure, and FIG. 7B is a schematic view showing a target gain, a hearing threshold and an energy distribution of a self-fitting hearing compensation device with real-ear measurement according to the present disclosure.

As shown in FIG. 7A, in step S11, an ANC earphone transmits the electrical signal $\tilde{S}$ to the app of a smart device via a transducer (Err. Mic).

And then, in step S12, the app receives the electrical signal $\tilde{S}$ (such as a test sentence of about 10 seconds long).

Afterwards, in step S13, take n sound frames, perform Fourier transform on each sound frame, and accumulate the energy of the n sound frames to obtain the energy distribution of the electrical signal $\tilde{S}$.

In step S14, calculate and compare the error between the energy distribution of the current electrical signal $\tilde{S}$ and the hearing threshold, the target gain, etc. If the error does not meet the error target, then the error is quantized again, and the quantized error and auditory dynamic range application optimization parameters are transmitted to the compensation gain conversion model to generate another set of corrected filter parameters by the compensation gain conversion model.

In step S15, adjust the amount of gain in each frequency band.

In step S16, generate the corrected ANC filter parameters (or the gain compensation parameters of the DSP circuit) via the compensation gain conversion model after model training.

Lastly, in step S17, if the above error does meet the error target, the ANC filter parameters are written into the chip of the ANC earphone (i.e., the ANC filter parameters are stored into the storage module of the ANC earphone) and/or the smart device; alternatively, the gain compensation parameters of the DSP circuit are written into the chip of an earphone with a DSP circuit.

It is worth to mention that the self-fitting hearing compensation device with real-ear measurement of the present disclosure adopts active noise cancellation (ANC) technology, but the same or similar noise cancellation technologies can all be applied in different embodiments, and the present disclosure is not limited to as such. In an embodiment, the filter (such as FF, FB, SZ, APT, etc.) parameters can be set via the information of "acoustic characteristics of the mechanism" and "acoustic compensation prescription," that is, the filter parameters in the ANC technology is set by means of the mean-square error (MSE) method, such that the ANC technology can perform the gain compensation capability of different frequencies for the sound source transmitted by the transducer. In an embodiment, the filters can respectively be feedforward (FF) filter, feedback (FB) filter, and audio gain compensation filter unit (such as SZ filter, APT filter), wherein the FF filter can receive the electrical signal of the transducer (Ref. Mic) to eliminate the external noise; the FB filter can receive the electrical signal of the transducer (Err. Mic) (that is, the transducer [Err. Mic] converts noise in the ear canal into electrical signal) to eliminate the noise in the ear canal; the audio gain compensation filter unit (such as SZ filter and APT filter) receives appropriate target curve to amplify the signal of each frequency band in the electrical signal. Besides, in the DSP circuit, a time domain (or a frequency domain) gain amplify unit in processing architecture can be adjusted, e.g., EQ filter, wide dynamic range compression, adaptive dynamic range optimization, etc.

Since the present disclosure is applicable to various smart apparatuses, such that the self-fitting hearing compensation device can be used in a non-audiometric testing room (such as living house, outdoor, car, park, etc.) environment without the assistance of a hearing professional to conduct audiometry (e.g., hearing test). That is, the self-fitting hearing compensation device of the present disclosure does not need to be limited to the audiometric testing room equipped with real-ear measurement instruments to perform the audiometry and real-ear measurement analysis, such that the present disclosure can provide automated, real-time, and customized hearing aids, auditory aids, or apparatuses with hearing-aid functions to users in the current real environment of a non-audiometric testing room.

In an embodiment, the hearing compensation device with real-ear measurement of the present disclosure is arranged in a hearing aid, e.g., an earphone (comprising but not limited to dynamic earphone, balanced armature earphone, piezoelectric earphone, pneumatic earphone, electrostatic earphone, wired transmission earphone, and wireless transmission earphone), an auditory aid, a noise cancellation earphone, a monitoring earphone, a pair of smart glasses, a wearable device, or a combination thereof. In another embodiment, the hearing aid with real-ear measurement of the present disclosure can also be a hearing apparatus with the aforementioned hearing compensation device, wherein the hearing compensation device is arranged and connected to the hearing apparatus.

In addition, the self-fitting hearing compensation device with real-ear measurement of the present disclosure combines the compensation gain conversion model technology and the wireless communication technology (e.g., Bluetooth, Wi-Fi, near-field communication [NFC], ultra-wideband [UWB], IEEE 802.15.4, and the like) via the app of a smart device to directly synchronize the real-time customized audiogram or hearing table of the user (especially the hearing-impaired person) to a noise cancellation module and/or hearing compensation module arranged in the same or single chip for operation, so as to provide user (especially the hearing-impaired patient) with comfortable listening experience in real time. Additionally, according to the aforementioned embodiments of the present disclosure, since the hearing-impaired patient using his/her own auditory apparatus or device (such as various smart apparatuses or devices cooperated with the ANC earphones or the TWS earphones) can conduct hearing test in various current real environments or real application environments (i.e., quiet or noisy environments) rather than in an audiometric testing room, such that the hearing-impaired person can turn on or turn off the noise cancellation module when performing the self-fitting hearing compensation of the present disclosure according to his/her own needs.

It is worth noting that the self-fitting hearing compensation device with real-ear measurement of the present disclosure does not need to be limited in an audiometric testing room when performing hearing tests and/or hearing gain compensation and does not require the assistance of a hearing professional, and the present disclosure also does not require using additional probe transducer, such that the present disclosure can provide automated, real-time and customized hearing-impaired patient's hearing apparatus (such as hearing aid, auditory aid, or earphone with hearing aid function, etc.) only by the device (such as hearing aid, auditory aid, earphone, etc.) and by a smart device combining the compensation gain conversion model technology and the wireless communication technology.

Figure 8:
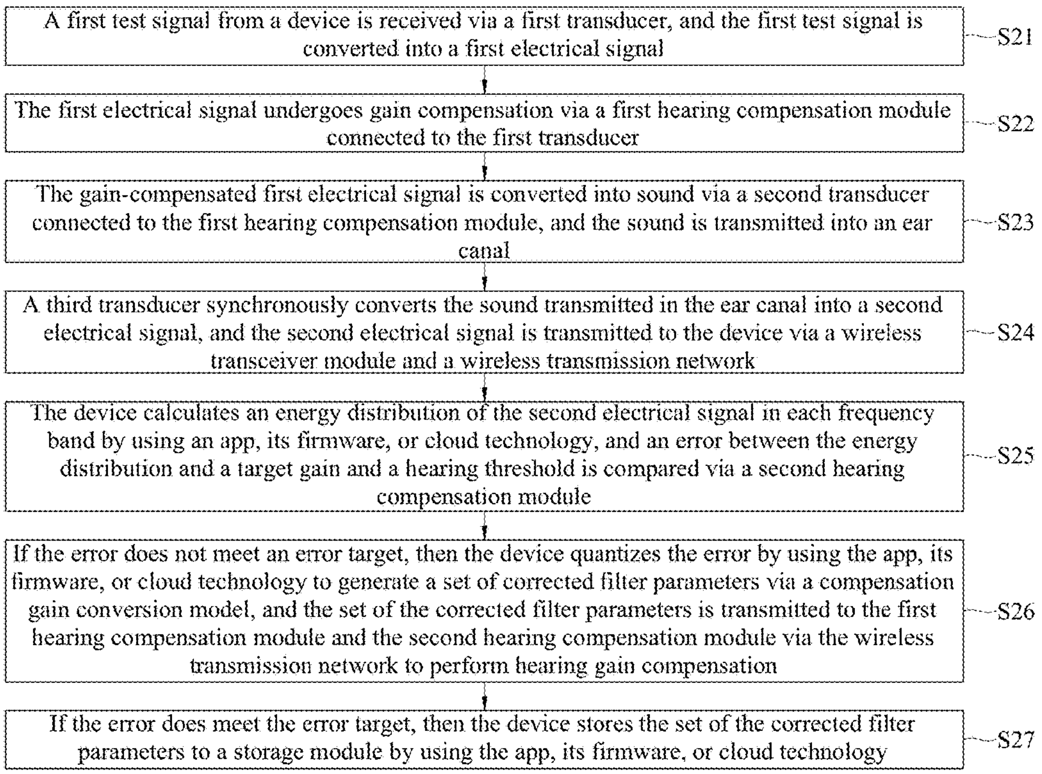
FIG. 8 is a flow chart showing steps of a self-fitting hearing compensation method with real-ear measurement according to the present disclosure.

FIG. 8 is a flow chart showing steps of a self-fitting hearing compensation method with real-ear measurement according to the present disclosure, and FIG. 8 is illustrated in conjunction with the description of the aforementioned embodiments, wherein the method at least includes the following steps S21 to S27.

In step S21, a first test signal from a device (such as a smart device or a mobile device) is received via a first transducer, and the first test signal is converted into a first electrical signal.

In step S22, the first electrical signal undergoes gain compensation via a first hearing compensation module connected to the first transducer.

In step S23, the gain-compensated first electrical signal is converted into sound via a second transducer connected to the first hearing compensation module, and the sound is transmitted into an ear canal.

In step S24, a third transducer synchronously converts the sound transmitted in the ear canal into a second electrical signal, and the second electrical signal is transmitted to the device via a wireless transceiver/transceiving module and a wireless transmission network.

In step S25, the device calculates an energy distribution of the second electrical signal in each frequency band by using an app, its firmware, or cloud technology, and an error between the energy distribution and a target gain and a hearing threshold is compared via a second hearing compensation module.

In step S26, if the error does not meet an error target, then the device quantizes the error by using the app, its firmware, or cloud technology to generate a set of corrected filter parameters via a compensation gain conversion model, and the set of the corrected filter parameters is transmitted to the first hearing compensation module and the second hearing compensation module via the wireless transmission network to perform hearing gain compensation.

In step S27, if the error does meet the error target, then the device stores the set of the corrected filter parameters to a storage module by using the app, its firmware, or cloud technology.

In another embodiment, in addition to storing the set of the corrected filter parameters to the storage module, the device can also store the original filter parameters or the corrected filter parameters to an apparatus or device with audio processing capability by using the app, its firmware, or cloud technology, wherein the apparatus or device has the hearing compensation module to perform hearing gain compensation.

Furthermore, in addition to the first transducer receiving the first test signal from the device (such as a smart device or a mobile device), the wireless transceiver/transceiving module can also receive the second test signal of the device via the wireless transmission network to perform hearing gain compensation. Besides, the first test signal is transmitted in the air, and the second test signal is transmitted via wireless communication.

In the aforementioned method, if the error still does not meet the error target, then the device quantizes the error again by using the app, its firmware, or cloud technology, and the quantized error and the auditory dynamic range application optimization parameters are transmitted to the compensation gain conversion model to generate another set of corrected filter parameters by the compensation gain conversion model, and the another set of the corrected filter parameters is transmitted to the first hearing compensation module and the second hearing compensation module via the wireless transmission network to perform hearing gain compensation.

In the aforementioned method, the first hearing compensation module is arranged in an active noise cancellation chip or a digital signal processing circuit chip, and the second hearing compensation module is arranged in the device (such as a smart device or a mobile device) and implemented by the app, its firmware, or cloud technology, wherein the first hearing compensation module is synchronized with the second hearing compensation module.

In an embodiment, the set of the corrected filter parameters is the filter parameters of the gain compensation of an active noise cancellation or the gain compensation parameters of a digital signal processing circuit, wherein the filter parameters of the gain compensation of the active noise cancellation are audio gain compensation filter unit (such as SZ or APT filter) parameters.

Besides, the aforementioned method is applied to the self-fitting hearing compensation device, and can also apply to hearing aids with active noise cancellation or digital signal processing circuit.

It is worth noting that if the error still does not meet the error target, then the device quantizes the error again by using the app, its firmware, or cloud technology to generate another set of corrected filter parameters via the compensation gain conversion model, and the another set of the corrected filter parameters is transmitted to the hearing compensation module via the wireless transmission network to perform another hearing gain compensation.

To sum up, the self-fitting hearing compensation device with real-ear measurement and the self-fitting hearing compensation method with real-ear measurement of the present disclosure combining active noise cancellation (ANC) technology with digital network technology and wireless transmission technology not only can enable earphone to emit reverse waves (or forward waves) with the same energy as the current noise to eliminate ambient noise in the ear canal, but also can directly perform hearing gain compensation on real-time customized audiogram or the hearing table of the user (especially the hearing-impaired patient) via the hearing compensation module during the real-ear measurement (REM), such that the signals of various frequency bands (such as forward signals and/or reverse signals) can be amplified. As such, the present disclosure can provide automated, real-time and customized hearing aids, auditory aids, or earphones with hearing-aid functions for hearing-impaired patients.

In addition, the self-fitting hearing compensation device with real-ear measurement and the self-fitting hearing compensation method with real-ear measurement of the present disclosure take the hearing loss characteristics of the hearing-impaired person into account via the compensation gain conversion model technology to provide a representative test sentence for the hearing-impaired person, and then perform real-ear measurement. Therefore, the present disclosure can provide automated, real-time, customized hearing aids, auditory aids, or earphones with hearing-aid functions for hearing-impaired patients.

Additionally, in an embodiment, the compensation gain conversion model can also automatically correct the compensation parameters (e.g., speech intelligibility index [SII], HASQI, HASPI, and the like) of the self-fitting hearing compensation device, wherein the compensation gain conversion model can be arranged in cloud, server, or smart device, and the present disclosure is not limited to as such.

Finally, in an embodiment, a computer program product is provided and utilizes the app, firmware, or cloud technology of the aforementioned device to execute the aforementioned method, and the computer program product can automatically store the original filter parameters or the corrected filter parameters to the apparatus or device (as shown by the apparatus/device 110 in FIG. 2, such as a smart device, a mobile device, a trumpet, or a speaker) with audio processing capability, wherein the apparatus or device has the hearing compensation module to perform hearing gain compensation. Therefore, the computer program product can choose to synchronize the corrected filter parameters to the self-fitting hearing compensation device or synchronize the original filter parameters/the corrected filter parameters to the apparatus or device with audio processing capability for audio processing and playback.

The above embodiments are set forth to illustrate the principles of the present disclosure and the effects thereof, and should not be interpreted as to limit the present disclosure. The above embodiments can be modified by one of ordinary skill in the art without departing from the scope of the present disclosure as defined in the appended claims. Therefore, the scope of protection of the right of the present disclosure should be listed as the following appended claims.

What is claimed is:

1. A self-fitting hearing compensation device with real-ear measurement, comprising:

a first transducer configured to receive a first test signal from a device and convert the first test signal into a first electrical signal;

a first hearing compensation module connected to the first transducer and configured to perform gain compensation on the first electrical signal;

a second transducer connected to the first hearing compensation module, wherein the second transducer converts the gain-compensated first electrical signal into sound and transmits the sound into an ear canal; and a third transducer configured to synchronously convert the sound transmitted in the ear canal into a second electrical signal, wherein the third transducer transmits the second electrical signal to the device via a wireless transmission network, wherein the device calculates an energy distribution of the second electrical signal in each frequency band, and compares an error between the energy distribution and a target gain and a hearing threshold via a second hearing compensation module, wherein if the error does not meet an error target, the device quantizes the error to generate corrected filter parameters via a compensation gain conversion model, and the corrected filter parameters are transmitted to the first hearing compensation module via the wireless transmission network to perform hearing gain compensation.

2. The self-fitting hearing compensation device with real-ear measurement of claim 1, wherein the first hearing compensation module is arranged in an active noise cancellation chip or a digital signal processing circuit chip, and the second hearing compensation module is arranged in the device.

3. The self-fitting hearing compensation device with real-ear measurement of claim 1, wherein the corrected filter parameters are filter parameters of gain compensation of an active noise cancellation or gain compensation parameters of a digital signal processing circuit.

4. The self-fitting hearing compensation device with real-ear measurement of claim 3, wherein the filter parameters of the gain compensation of the active noise cancellation are audio gain compensation filter unit parameters.

5. The self-fitting hearing compensation device with real-ear measurement of claim 1, further comprising: a storage module, wherein if the error does meet the error target, the device stores the corrected filter parameters to the storage module.

6. The self-fitting hearing compensation device with real-ear measurement of claim 1, wherein the device stores original filter parameters or the corrected filter parameters to an apparatus with audio processing capability, wherein the apparatus has a third hearing compensation module to perform hearing gain compensation.

7. The self-fitting hearing compensation device with real-ear measurement of claim 1, further comprising: a wireless transceiver module, wherein the wireless transceiver module receives a second test signal from the device via the wireless transmission network to perform hearing gain compensation.

8. The self-fitting hearing compensation device with real-ear measurement of claim 1, wherein if the error does not meet the error target, the device quantizes the error again and transmits the quantized error and auditory dynamic range application optimization parameters to the compensation gain conversion model to generate another corrected filter parameters via the compensation gain conversion model, and the another corrected filter parameters are transmitted to the first hearing compensation module via the wireless transmission network to perform the hearing gain compensation.

9. The self-fitting hearing compensation device with real-ear measurement of claim 1, wherein the self-fitting hearing compensation device is arranged in a hearing aid with an active noise cancellation or a digital signal processing circuit.

10. The self-fitting hearing compensation device with real-ear measurement of claim 1, wherein the device further comprises: a probe or a long earplug, one end of the probe or the long earplug is connected to the third transducer, and the other end of the probe or the long earplug is positioned into a first curve of an external ear canal or to a distance of 5 mm from an eardrum.

11. A self-fitting hearing compensation method with real-ear measurement, comprising:

receiving and converting, by a first transducer, a first test signal from a device into a first electrical signal;

performing, by a first hearing compensation module connected to the first transducer, gain compensation on the first electrical signal;

converting, by a second transducer connected to the first hearing compensation module, the gain-compensated first electrical signal into sound, wherein the second transducer transmits the sound into an ear canal;

synchronously converting, by a third transducer, the sound transmitted in the ear canal into a second electrical signal, wherein the third transducer transmits the second electrical signal to the device via a wireless transmission network;

calculating, by the device, an energy distribution of the second electrical signal in each frequency band; and comparing, by a second hearing compensation module, an error between the energy distribution and a target gain and a hearing threshold, wherein if the error does not meet an error target, the device quantizes the error to generate corrected filter parameters via a compensation gain conversion model, and the corrected filter parameters are transmitted to the first hearing compensation module via the wireless transmission network to perform hearing gain compensation.

12. The self-fitting hearing compensation method with real-ear measurement of claim 11 wherein the corrected filter parameters are filter parameters of gain compensation of an active noise cancellation or gain compensation parameters of a digital signal processing circuit.

13. The self-fitting hearing compensation method with real-ear measurement of claim 12, wherein the filter parameters of the gain compensation of the active noise cancellation are audio gain compensation filter unit parameters.

14. The self-fitting hearing compensation method with real-ear measurement of claim 11, wherein if the error does meet the error target, the device stores the corrected filter parameters to a storage module.

15. The self-fitting hearing compensation method with real-ear measurement of claim 11, wherein the device stores original filter parameters or the corrected filter parameters to an apparatus with audio processing capability, wherein the apparatus has a third hearing compensation module to perform hearing gain compensation.

16. The self-fitting hearing compensation method with real-ear measurement of claim 11, wherein if the error does not meet the error target, the device quantizes the error again and transmits the quantized error and auditory dynamic range application optimization parameters to the compensation gain conversion model to generate another corrected filter parameters via the compensation gain conversion model, and the another corrected filter parameters are transmitted to the first hearing compensation module via the wireless transmission network to perform the hearing gain compensation.

17. The self-fitting hearing compensation method with real-ear measurement of claim 11, wherein the self-fitting hearing compensation method is applied to a self-fitting hearing compensation device, or applied to a hearing aid with an active noise cancellation or a digital signal processing circuit.

18. The self-fitting hearing compensation method with real-ear measurement of claim 11, wherein the first hearing compensation module is arranged in an active noise cancellation chip or a digital signal processing circuit chip, and the second hearing compensation module is arranged in the device.

19. The self-fitting hearing compensation method with real-ear measurement of claim 11, after the energy distribution of the second electrical signal in each frequency band being calculated by the device and the error between the energy distribution and the target gain and the hearing threshold being compared by the second hearing compensation module, further comprising:

calculating a required gain compensation by using a compensation prescription according to the hearing threshold;

transmitting the required gain compensation to the compensation gain conversion model;

calculating required auditory dynamic range application optimization parameters by using auditory dynamic range application optimization according to the hearing threshold; and transmitting the required auditory dynamic range application optimization parameters to the compensation gain conversion model, wherein if the error does not meet the error target, the device quantizes the error and transmits the error to the compensation gain conversion model to generate the corrected filter parameters via the compensation gain conversion model, and the corrected filter parameters are transmitted to the first hearing compensation module via the wireless transmission network to perform hearing gain compensation.

20. A computer program product implementing the self-fitting hearing compensation method with real-ear measurement of claim 11.

* * * * *